March 5, 1929.  C. F. MILLER  1,704,509

BUTTER CUTTER FRAME

Filed March 1, 1928

Inventor
Charles F. Miller
By Wm. O. Bell, Atty.

Patented Mar. 5, 1929.

1,704,509

UNITED STATES PATENT OFFICE.

CHARLES F. MILLER, OF CEDAR RAPIDS, IOWA, ASSIGNOR, BY MESNE ASSIGNMENTS, TO CHERRY-BURRELL CORPORATION, OF WILMINGTON, DELAWARE, A CORPORATION OF DELAWARE.

BUTTER-CUTTER FRAME.

Application filed March 1, 1928. Serial No. 258,175.

This invention relates generally to butter cutting machines and more particularly to the cutter frame or harp.

The object of the invention is to incline the wires of the cutter frame or harp to the direction of movement of the butter slab so that they will cut the butter slab in a more efficient manner than heretofore with a shear cut and without breaking or chipping the butter.

Another object of the invention is to arrange the wires of the cutter frame or harp in an inclined position to the direction of movement of the butter slab and in a staggered relation to each other so that alternate wires will pitch forward and backward, thereby providing for an efficient shear cut and maintaining the travel of the slab in a straight direction.

The invention also has for its object generally to cut uniform prints, having clean square cut edges and of uniform weight; and to materially reduce the strain on the cutter wires by inclining them to the direction of travel of the butter slab.

In the accompanying drawings illustrating a selected embodiment of the invention:

Figure 1:
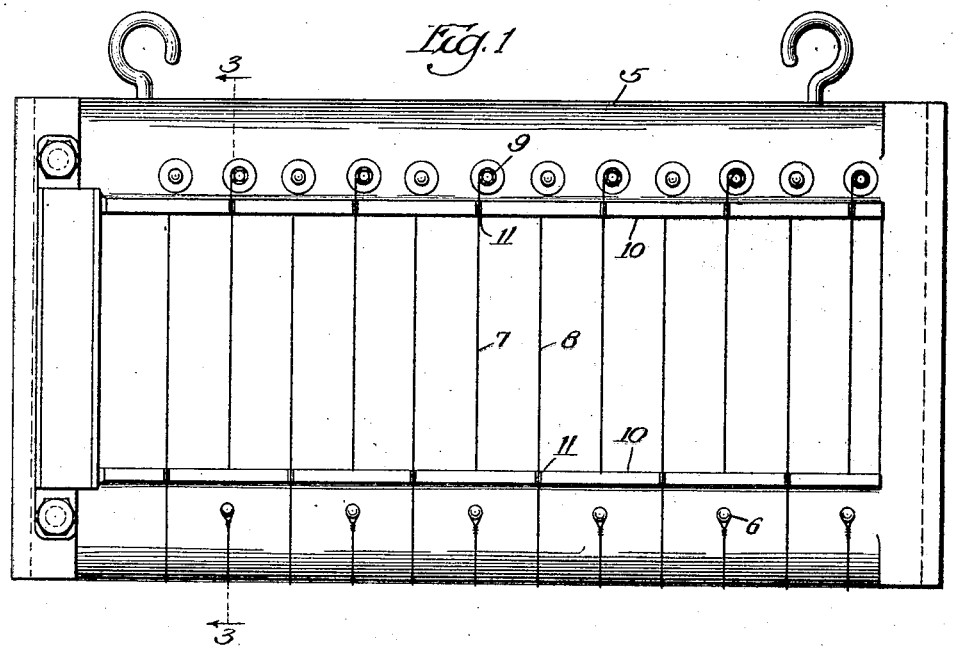
Fig. 1 is a front elevation of a cutter frame or harp embodying the invention.
Figure 2:
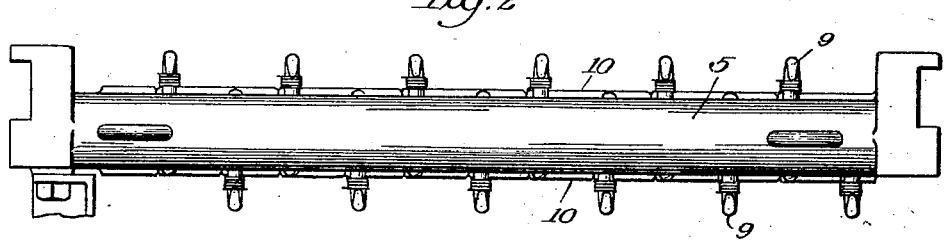
Fig. 2 is a top plan view of the cutter frame or harp.
Figure 3:
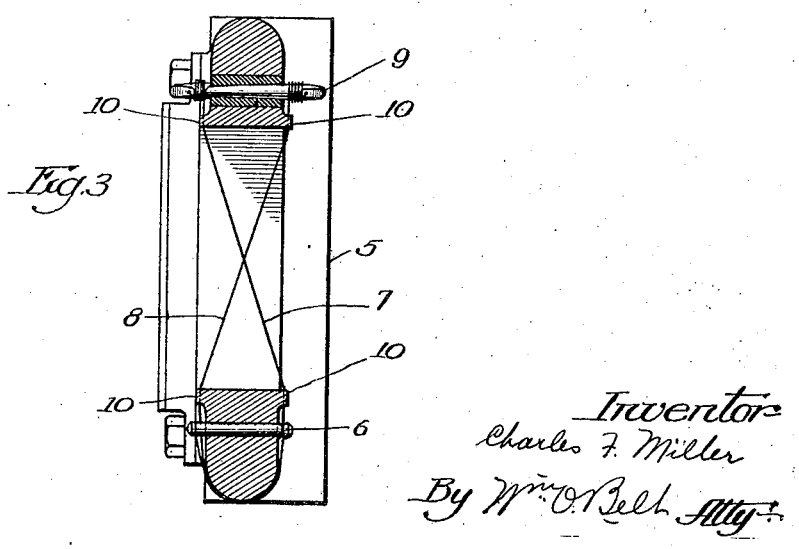
Fig. 3 is a transverse sectional view on the line 3—3 of Fig. 1.

Referring to the drawings the invention comprises a frame 5 of any suitable construction having means 6 for anchoring a plurality of wires 7, 8 to the bottom of the frame and means 9 located at the top of the frame for stretching and tensioning the wires across the frame. The anchoring means 6 may be in the form of pins which pass through the lower part of the frame and project on opposite sides thereof to be engaged by looped ends of the wires; and the stretching and tensioning means may be in the form of tapered pins which can be turned to stretch and tension the wires and then snugly pressed into the proper part of the frame to secure them in adjusted position. Guides 10 are provided at the inner edges of the top and bottom of the frame and these guides have V slots 11 therein to receive the wires and hold them in properly spaced relation. The wires are stretched from one side of the bottom to the opposite side of the top inclined to the direction of travel of the slab through the frame, and I prefer that some of the wires should incline in one direction from one side of the bottom to the opposite side of the top, and that other wires should incline in the other direction from the other side of the bottom to the opposite side of the top, and that alternate wires should be oppositely inclined in a staggered relation.

When the wires are inclined to the direction of movement of the butter slab through the frame they will cut the slab with a shear cut which greatly facilitates the cutting operation, insures the production of uniform prints with square cut edges and of uniform weight, and prevents the butter from breaking or chipping at the end of each cut. Furthermore, by arranging the wires to cut the butter with a shearing action the strain on the wires is materially lessened, the wires are more easily maintained at proper tension, and the liability of loosening or breaking the wires is greatly reduced. I also find that by staggering the wires so that alternate wires will be pitched in opposite directions the slab is held to a straight line travel through the frame, which is highly desirable and facilitates the cutting operation.

I am aware that the invention may be embodied in cutter frames which differ in construction from the one shown in the drawings and I reserve the right to make all changes in the form, construction and arrangement of parts as fairly fall within the scope of the following claims.

I claim:

1. A butter cutter frame through which a slab of butter is adapted to be passed, and a plurality of wires stretched across the frame inclined to the direction of travel of the slab, some wires being inclined in one direction and other wires being inclined in another direction.

2. A butter cutter frame through which a slab of butter is adapted to be passed, and a plurality of wires stretched across the frame inclined to the direction of travel of the slab, some of said wires being inclined forwardly from bottom to top and others of said wires being inclined rearwardly from bottom to top.

3. A butter cutter frame through which a slab of butter is adapted to be passed, and a plurality of wires stretched across the frame inclined to the direction of travel of the slab, said wires being alternately inclined in opposite directions.

4. A butter cutter frame through which a slab of butter is adapted to be passed, and a plurality of wires stretched across the frame inclined to the direction of travel of the slab, some of said wires being inclined from one side edge of the lower part of the frame to the opposite side edge of the upper part of the frame, and others of said wires being inclined from the other side edge of the lower part of the frame to the opposite side edge of the upper part of the frame.

5. A butter cutter frame through which a slab of butter is adapted to be passed, and a plurality of wires stretched across the frame inclined to the direction of travel of the slab, alternate wires being inclined in opposite directions and crossing at or about midway between the top and bottom of the frame.

6. A butter cutter frame through which a slab of butter is adapted to be passed, and a plurality of wires stretched across the frame inclined to the direction of travel of the slab, said wires being oppositely inclined in staggered relation.

CHARLES F. MILLER.